United States Patent [19]
Camp, Jr.

[11] Patent Number: 6,035,202
[45] Date of Patent: Mar. 7, 2000

[54] METHOD AND APPARATUS FOR LOCATING A MOBILE UNIT

[75] Inventor: William O. Camp, Jr., Chapel Hill, N.C.

[73] Assignee: Ericsson Inc., Research Triangle Park, N.C.

[21] Appl. No.: 08/994,675

[22] Filed: Dec. 19, 1997

[51] Int. Cl.[7] .............................. H04M 7/20; G01S 3/02
[52] U.S. Cl. .......................................... 455/456; 342/463
[58] Field of Search ................................... 455/456, 67.6, 455/440, 553; 342/450, 458, 457, 463; 701/300, 207

[56] References Cited

U.S. PATENT DOCUMENTS

| | | | |
|---|---|---|---|
| 4,445,118 | 4/1984 | Taylor et al. | 343/357 |
| 4,494,119 | 1/1985 | Wimbush | 343/457 |
| 4,613,864 | 9/1986 | Hofgen | 342/357.01 |
| 4,651,156 | 3/1987 | Martinez | 342/457 |
| 5,043,736 | 8/1991 | Darnell et al. | 342/357.1 |
| 5,045,861 | 9/1991 | Duffett-Smith | 342/457 |
| 5,327,144 | 7/1994 | Stilp et al. | 342/387 |
| 5,404,376 | 4/1995 | Dent | 375/200 |
| 5,510,801 | 4/1996 | Engelbrecht et al. | 342/457 |
| 5,526,357 | 6/1996 | Jandrell | 370/346 |
| 5,629,693 | 5/1997 | Janky | 340/988 |
| 5,670,964 | 9/1997 | Dent | 342/457 |
| 5,689,270 | 11/1997 | Kelley et al. | 342/357 |
| 5,701,328 | 12/1997 | Schuchman et al. | 375/204 |
| 5,758,288 | 5/1998 | Dunn et al. | 455/456 |

FOREIGN PATENT DOCUMENTS

| | | |
|---|---|---|
| 0 303 371 A1 | 2/1989 | European Pat. Off. . |
| PCT/US98/ 26888 | 3/1999 | WIPO . |

OTHER PUBLICATIONS

Project #19, Rural Mayday/800 Call–In System Feasibility, *Enabling Technologies for Mayday Systems*, Updated Technical Report, May 21, 1997, Mobile & Portable Radio Research Group, Center for Transportation Research, Virginia Polytechnic Institute and State University, pp. 18–19.

*Primary Examiner*—Reinhard J. Eisenzopf
*Assistant Examiner*—Charles N. Appiah
*Attorney, Agent, or Firm*—Jenkens & Gilchrist, P.C.

[57] ABSTRACT

A system for locating a mobile transceiver is disclosed. A first receiver associated with a mobile transceiver detects signals transmitted from fixed transmitter locations broadcasting, for example, FM signals. A demodulated audio portion of the received FM signals, along with an encoded representation of the channel of the transmitted FM signal, are transmitted to a second receiver at a known location. The second receiver is tuned to the channel indicated by the channel data. A correlator time-shifts the received audio portion of the FM signal until a correlation with the received signal at the second receiver is achieved. This process may be repeated for several transmitted FM signals. The time differences between the signals received at the first and second receivers along with the known location of the FM transmitters are used to determine the location of the mobile unit.

25 Claims, 6 Drawing Sheets

METHOD AND APPARATUS FOR LOCATING A MOBILE UNIT

BACKGROUND OF THE INVENTION

1. Technical Field of the Invention

The present invention relates to the location of a remote mobile unit, and more particularly, to a system enabling location of a mobile unit using FM, AM or TV signals transmitted from known locations.

2. Description of Related Art

As cellular telephones become more widely used by the public, there arises the need to be able to develop information about the location of the cellular telephone so that this may be provided to a cellular base station serving the cellular telephone. By knowing the position of the cellular telephone a variety of different services may be provided to the user, such as providing directions to a selected site, sending emergency services to a user that may be in need of assistance, etc. The problem with acquiring location information arise from the increased cost, size and power consumption requirements for a cellular telephone.

One solution to the problem has been the use of time-of-arrival (TOA) techniques used in conjunction with existing cellular telephone base stations. The problem with time-of-arrival techniques using existing cellular telephone base stations arises from the uncertainty that a sufficient number of base stations will be present to provide the ability to perform triangulation calculations enabling determination of the location of a mobile unit. If sufficient base stations are not present, results may not be calculated and location information is temporarily unavailable. An alternative solution involves the use of global positioning systems (GPS). GPS systems, while effective, have limited sensitivity and may not work in all required environments particularly inside many buildings. These factors limit GPS for location to vehicular, rural and suburban environments.

Since a great deal of cellular telephone usage involves operating a mobile unit within a building or other structure, the ability to calculate location information for a mobile unit located within a structure is necessary. Thus, a need for providing improved location capability for a mobile unit that does not drastically increase the costs, size and power consumption of the unit is greatly desired.

SUMMARY OF THE INVENTION

The present invention overcomes the foregoing and other problems with a system and method for locating a mobile unit. An existing mobile unit has a first receiver associated with the mobile unit to enable for the scanning and detection of a signal, such as an FM, AM, or TV signal, emitted from a first known location. The first receiver scans for a signal having at least a preselected signal strength. After a suitable signal is detected, a demodulated audio portion of the signal is extracted and transmitted to a second known location along with a digitally encoded representation of the channel upon which the signal was detected.

The encoded channel information is decoded at the second known location, and a second receiver is tuned to the channel such that the signal from the first known location again may be detected. A correlator compares and time-shifts the audio portion of the signal transmitted from the first receiver to the received signal at the second receiver until a substantially identical portion of the received signal is detected at the second receiver. This information is used to determine a time difference between the received FM, AM or TV signal at the first and second receivers. This process is repeated for a number of transmitted FM, AM or TV signals from known locations until a processor may calculate the position of the mobile unit using the time differences and the known origination locations of the transmitted signals using geometric calculations.

In an alternative embodiment, the mobile unit may be configured such that the receiver circuitry of the mobile unit operates within first and second modes of operations. During the first mode of operation, the receiver circuitry receives the transmitted signal from a known location for comparison to the same signal at the second receiver for location calculations. During a second mode of operation, the receiver circuitry performs normal cellular telephone transceiving operations. A switching mechanism enables changes in operation between these modes.

BRIEF DESCRIPTION OF THE DRAWINGS

For a more complete understanding of the present invention, reference is made to the following detailed description taken in conjunction with the accompanying drawings wherein.

DETAILED DESCRIPTION OF THE INVENTION

Figure 1:
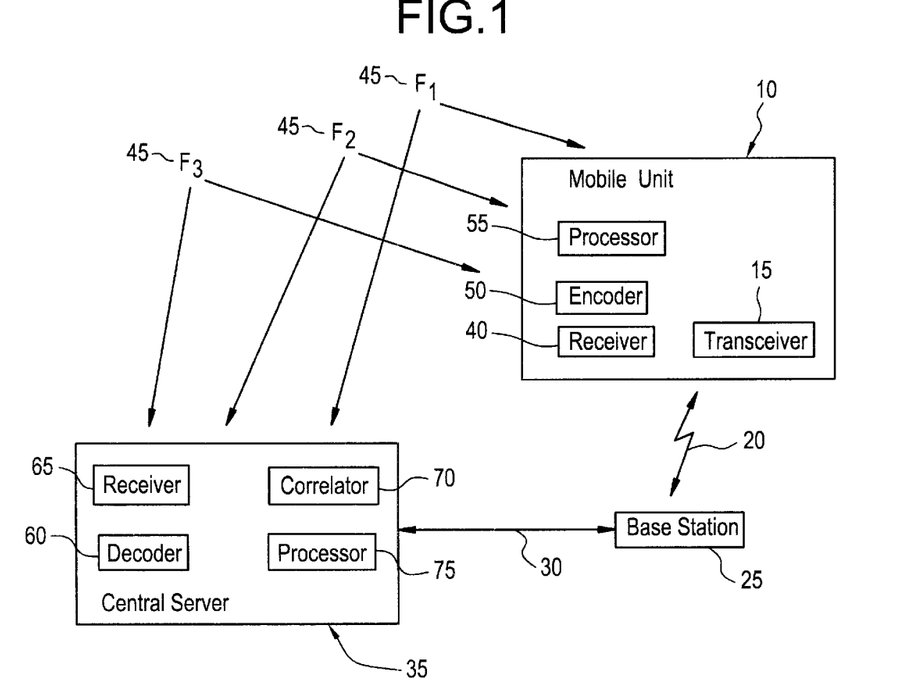
FIG. 1 is a block diagram of the mobile unit location system of the present invention.

Referring now to the Drawings, and more particularly to FIG. 1, there is illustrated a block diagram of a system for locating a mobile unit. The system comprises a mobile unit 10, including a transceiver 15 enabling an air interface communications link 20 to be generated between the mobile unit and a base station 25. The base station 25 is further linked through a normal cellular backhaul, such as a public-switched telephone network 30, to a central server 35 at a precisely known location. While the illustration of FIG. 1 describes the central server 35 located remotely from the base station 25, it should be understood that the central server may be placed at any location, including at the base station site.

In addition to the normal transceiver circuitry 15, the mobile unit 10 includes a first receiver 40 capable of detecting signals from a variety of known transmission locations 45 designated as F1, F2, and F3. In a preferred embodiment, the receiver 40 comprises a single chip FM receiver capable of receiving the FM band and transmitting in rapid succession short (approximately 0.1 second) bursts of demodulated audio signals on the reverse voice channel of the air interface 20. The receiver 40 scans for signals transmitted from each of the transmitting locations 45 searching for a signal meeting certain preselected criteria.

The signals transmitted from each of the known locations may comprise a frequency modulated (FM), amplitude modulated (AM), or a TV signal. The reason for the choice of these types of signals is their ability to penetrate within structures and buildings, such that a mobile unit 10 may be located even when indoors. Thus, any other signals having this characteristic that are transmitted from a known physical location 45 would also be acceptable for use with the present invention. These type of signals are also readily available from known public broadcast networks for radio and television.

Processing means 55 within the mobile unit 10 extracts demodulated audio data from the signal received from a known location 45 and transmits the extracted audio data to the base station 25 over the air interface 20. Included with the audio data transmission to the base station 35 is encoded digital data generated by an encoder 50 identifying the channel upon which the FM, AM or TV signal received by the transmitter 40 is being transmitted. The audio data and the attached encoded channel data are forwarded from the base station 25 to the central server 35 via the backhaul link 30, wherein a decoder 60 decodes the encoded channel data. The decoded channel data is used by a second receiver 65 to tune to the channel transmitting the FM, AM or TV signal originally received by the mobile unit 10.

A correlator 70 compares and time-shifts the demodulated audio data portion from receiver 40 until an exact correlation occurs with audio data in the transmitted signal received by receiver 65 at the client server 35. This enables a determination of a time difference between the signal received by the mobile unit 10 and the client server 35. This process may be repeated for a number of transmitted FM, AM or TV signals to determine a time difference for a number of signals. A processor 75 within the client server 35 utilizes the time differences plus the known locations of the transmission sites 45 to geometrically calculate a position for the mobile unit 10.

Figure 2:
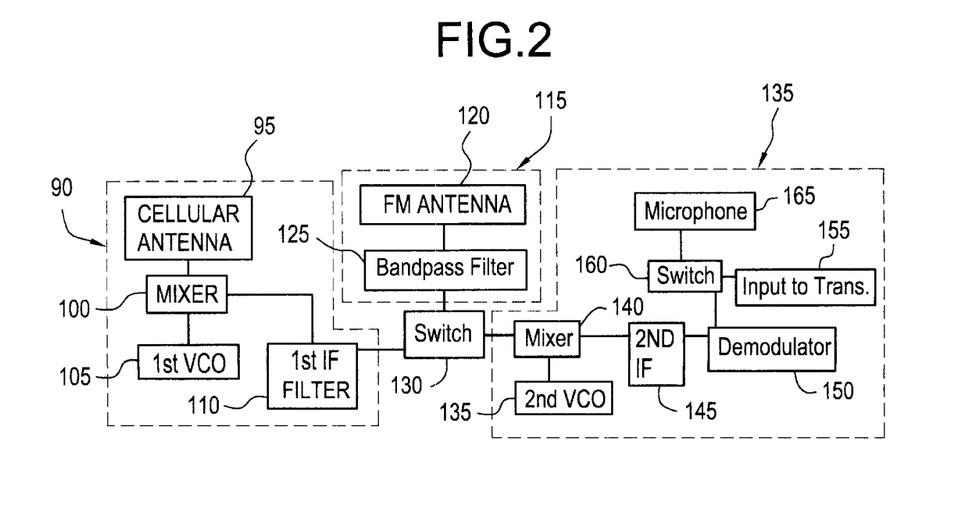
FIG. 2 is a block diagram of an alternative embodiment of the mobile unit using a switch to change between transmitting in a normal cellular transceiving mode and receiving a transmitted signal from a known location.

Referring now to FIG. 2, there is illustrated an alternative embodiment of a mobile unit 10 having circuitry enabling transceiver circuitry associated with the mobile unit 10 to act as the receiver for reception of the FM, AM or TV signals and as the transceiver for normal cellular operations. This enables a sharing of the circuitry to limit hardware requirements. The cellular telephone reception circuitry 90 includes a cellular antenna 95 for reception of cellular signals and a mixer 100 for mixing the received cellular signals with a first oscillator 105 signal to generate a first IF signal. The first IF signal is filtered via a first IF filter 110. The FM reception circuitry 115 (in the case of receiving an FM signal) consists of a FM antenna 120 for receiving FM signals from the known transmitters 45, and a bandpass filter 125 for filtering the received FM signal. A switch 130 switches between the FM front end converter 115 and cellular front end converter 90 to enable processing of the signal by the remaining common transceiver circuitry 136.

The switched signal is mixed at mixer 140 with a second oscillator 135 signal to generate a second intermediate frequency prior to filtering by a filter 145. The oscillator circuit 135 must have sufficient range to tune to the frequency required to mix the FM band signals down to the second IF frequency as well as the frequency necessary for proper operation of the cellular terminal. Notice that the second intermediate frequency bandwidth may not be optimal for reception of the wider bandwidth FM band signals. However, the demodulated signal will be usable and would require that the IF bandwidth and receiver 40 have a similar bandwidth. This occurs for the case when source 45 is an FM station and the cellular system is a GSM system. Alternatively, the second intermediate frequency of the mobile unit could be switchable between that which normally is used by a cellular terminal and that which may be used by an FM band receiver. The filtered signal is demodulated at a demodulator 150 and switched to the transmission circuitry 155. A second switch 160 switches between the demodulator 150 and the cellular telephone microphone 165, receiving input from a user.

Figure 3:
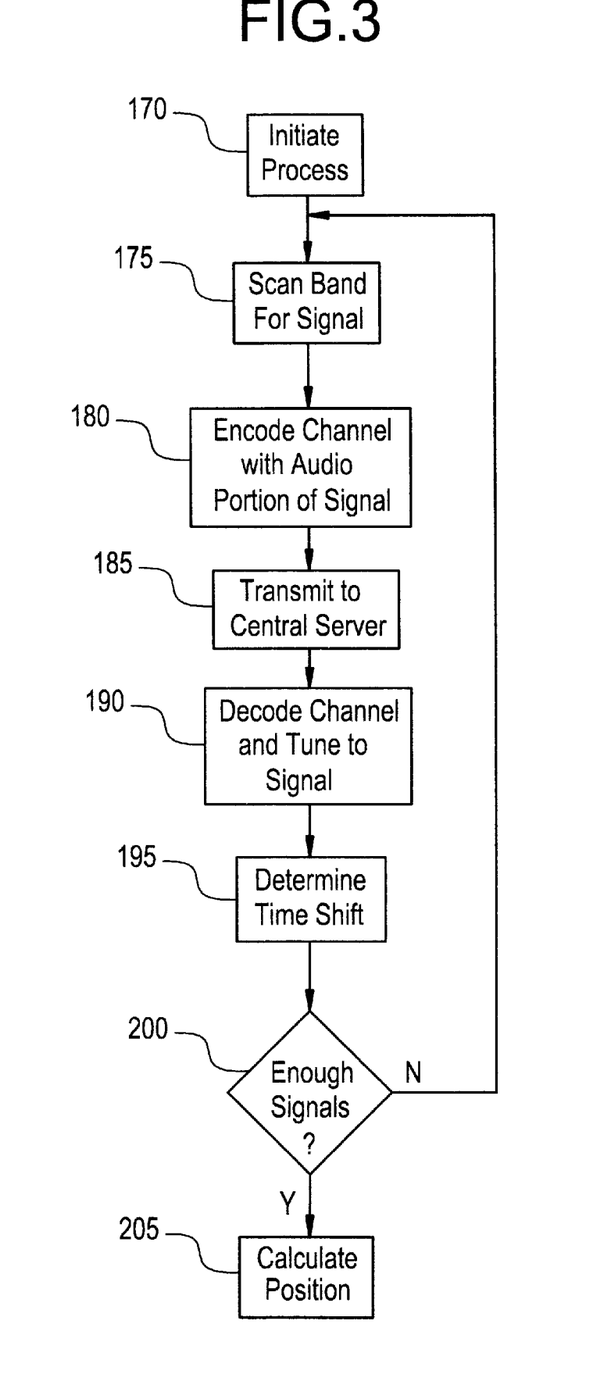
FIG. 3 is a flow diagram illustrating the operation of the system of the present invention.

Referring now to FIG. 3, there is an illustration of the method for determining the location of a mobile unit 10 using the system described previously with respect to FIG. 1. Upon initiation of the process at step 170, the receiver 40 scans the reception band at step 175 for a signal strong enough to meet the signal strength criteria established for reception of a signal. The strength criteria may comprise a particular signal-to-noise ratio or other known signal strength factors. The channel of the received signal is encoded at step 180 with a demodulated portion of the received signal for transmission to the central server 35 at step 185.

Upon receipt of the signal at the central server 35, the channel data is decoded at step 190 from the signal and used to tune the receiver 65 at the channel server 35 to the indicated channel frequency. The correlator 30 correlates the audio portion transmitted to the client server 35 with the signal being received at the receiver 65 to locate a substantially correlating portion to determine the time difference between the signal received at the mobile unit receiver 55 and the signal received at the central server receiver 65.

Once the time difference has been established at step 195, a determination is made at step 200 as to whether enough signals have been received to determine the location of the mobile unit 10. Three or more FM channels must be obtained to calculate a unique solution for the location of the mobile unit 10 in order to remove the systematic time error associated with the hardware comprising the system. If enough signals have not been located, control passes back to step 175 to scan for another signal. If enough signals have been located, the position of the mobile unit 10 is calculated at step 105 using the time differences for the scanned signals and the known location of the transmission sites 45 using geometric techniques such as triangulation.

Figure 4:
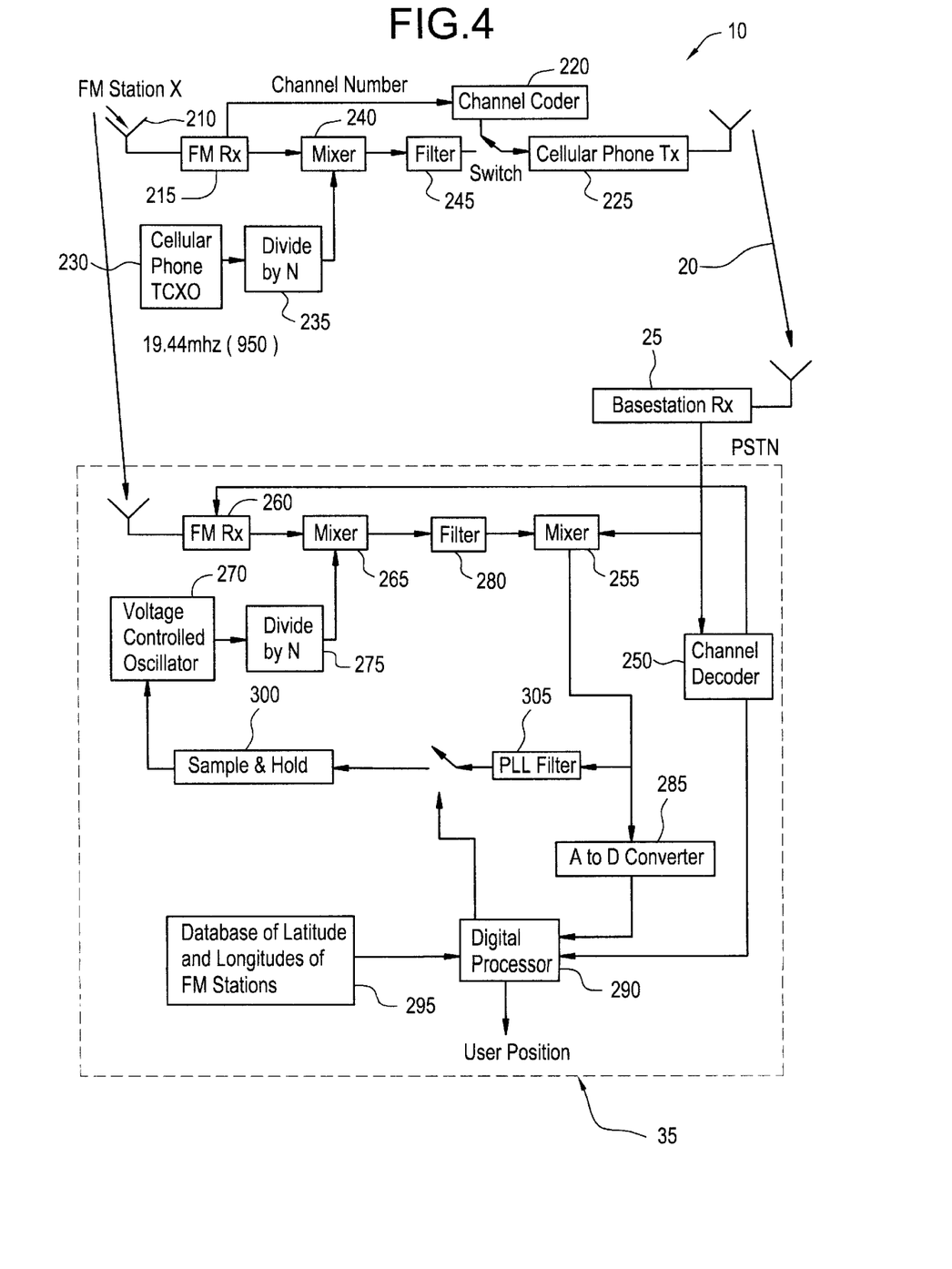
FIG. 4 is a block diagram of an alternative embodiment.

In another embodiment of the present invention illustrated in FIG. 4, the accuracy of the location calculation process may be improved by using a demodulated FM signal that is both higher in frequency and repeatable. The FM pilot signal transmitted by FM transmitting stations comprises a 19 kHz sine wave with +/−2 Hz accuracy fitting these requirements. The problem with the FM pilot signal is that its frequency is outside the 3 kHz upper limit of the audio passband for a cellular telephone. However, the FM pilot signal may be downconverted from the 19 kHz range to a frequency within the audio passband. The down conversion process would not alter the phase shift of the received signal from the phase shift at the higher 19 kHz range. The lower frequency also makes it easier to resolve a given amount of phase shift between signals at a mobile unit 10 and the central server 35.

The problem with this implementation arises from the introduction of an unknown quantity within the system in the form of the frequency of the local oscillator used to downconvert the 19 kHz pilot tone to the audio band. The solution to this problem is to utilize a fourth FM station signal to calibrate out the unknown local oscillator frequency in addition to the three signals required to determine the position of the mobile unit 10. It should be realized that the 19 kHz pilot tone has a limited unambiguous time delay of approximately 7.5 Km or 5 miles. Thus, the present embodiment should be used when the unknown location range is less than 5 miles.

FIG. 4 illustrates the mobile unit 10, base station 25 and central server 35 according to the present embodiment. The FM station signals (namely the 19 kHz pilot signal) are received by an antenna 210 and processed by an FM receiver 215. A channel encoder 220 determines the FM channel being received and encodes the signal into a digital format for transmission via the mobile unit transmitter 225. A local oscillator 230 generates an oscillator signal which is divided by an integer N at 235 and mixed with a received FM pilot signal at mixer 240 to downconvert the FM pilot signal to the audio range. The downconverted signal is filtered by a lowpass or bandpass filter 245 prior to transmission by the mobile unit transmitter 225.

The signal transmitted from the mobile unit 10 to the base station 25 via an air interface 20 is forwarded to the central server 35. A channel decoder 250 within the central server 35 determines the encoded channel for a received FM pilot signal and forwards this information to the FM receiver 260. The FM receiver 260 tunes to the channel indicated by the channel decoder 250 and inputs the FM pilot signal received at the indicated channel to a mixer 265. The received FM pilot signal is mixed with a signal from a voltage controlled local oscillator 270 which has been divided by an integer N at 275 to provide a signal in the desired audio range. A sample and hold mechanism 300 sets and locks the voltage control oscillator 230 to a frequency to null out the effects of the local oscillator 230 of the mobile unit 10 while the phase-locked loop filter 305 path is opened for the three measurements required to determine the mobile unit's position after the first measurement calibrates the frequency of the local oscillator 230. The downconverted signal is filtered by a filter 280 and mixed with the received signal from the mobile unit 10 at mixer 255. The mixed signal is converted from analog to digital at A/D converter 385 and processed by a digital processor 290 in conjunction with a data base of latitudes and longitudes of known FM stations 295 and at least two other received FM pilot signals to determine the position of the mobile unit 10.

Figure 5:
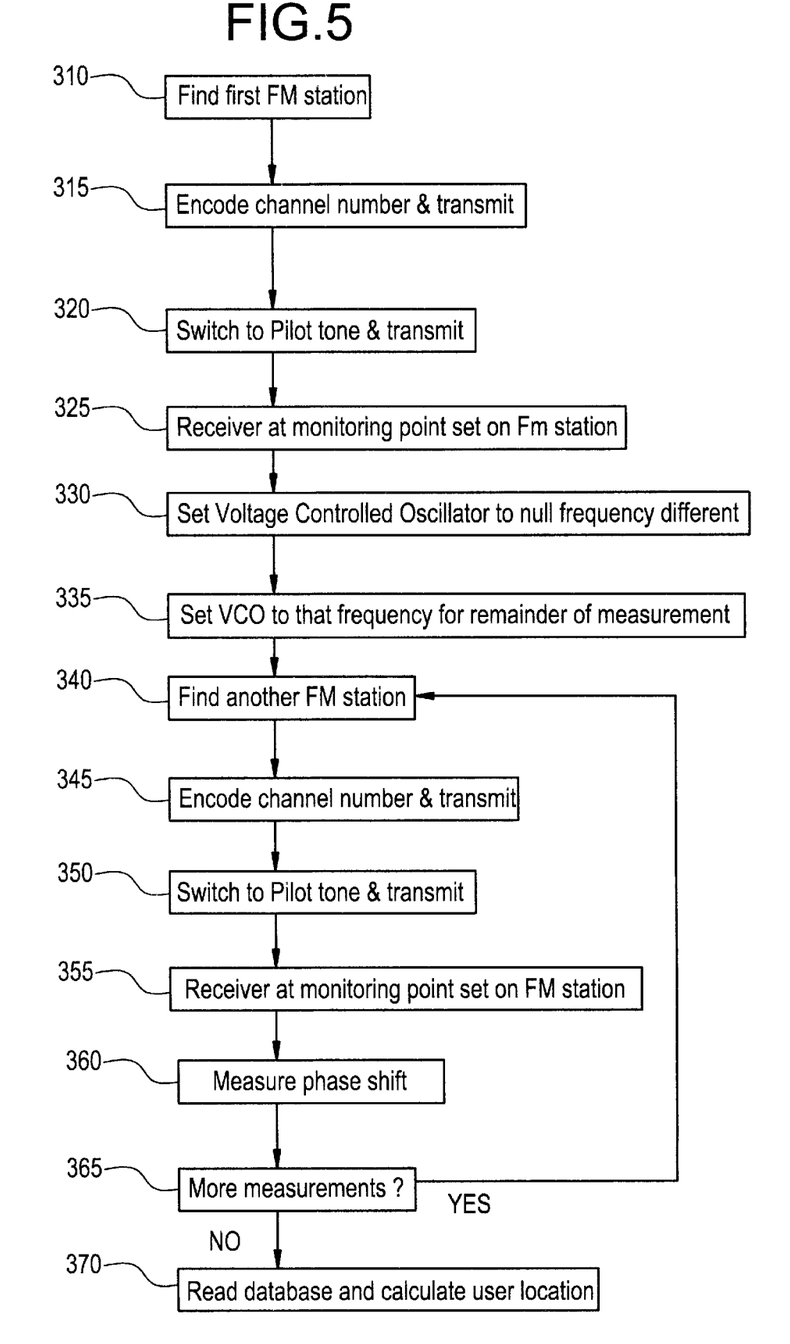
FIG. 5 is a flow diagram illustrating the operation of the embodiment of FIG. 4.

Referring now to FIG. 5, there is a flow diagram illustrating the method for determining the location of a mobile unit 10 using a FM pilot signal according to the embodiment of FIG. 4. At step 310, a first FM pilot tone from an FM station is located, and the channel number for the received FM pilot tone is encoded and transmitted at step 315 to the base station 25. The FM receiver 215 is tuned to the located FM pilot tone signal, and the received signal is forwarded to the base station 25 at step 320. Using the received channel information, the central server 35 begins monitoring at step 325 the indicated FM pilot tone. The voltage control oscillator 270 within the central server 35 is set to a frequency that nulls the frequency of the local oscillator 230 of the mobile station 10 at step 330. The voltage control oscillator 270 is locked at step 235 to remain at the set frequency for the remainder of the measurements necessary to locate the mobile unit 10 by the sample and hold mechanism 300.

A next FM station and associated FM pilot tone is located by the mobile unit 10 at step 340, and the channel information for the located tone is encoded and transmitted at step 345 to the base station 25. The mobile station FM receiver 215 is tuned to the located pilot tone and the received signal is transmitted to the base station 35 at step 350. The receiver 260 at the central server 35 is tuned to the indicated FM station at step 355, and the phase shift between signals received at the central server 35 and the mobile station 10 is measured at step 360. Inquiry step 365 determines whether additional FM pilot tone signal measurements are required to locate the position of the mobile unit 10, and if so, returns control to step 340. Otherwise, the phase shift information for received signals is utilized with the data base information to calculate at step 370 the position of the mobile unit 10.

Figure 6:
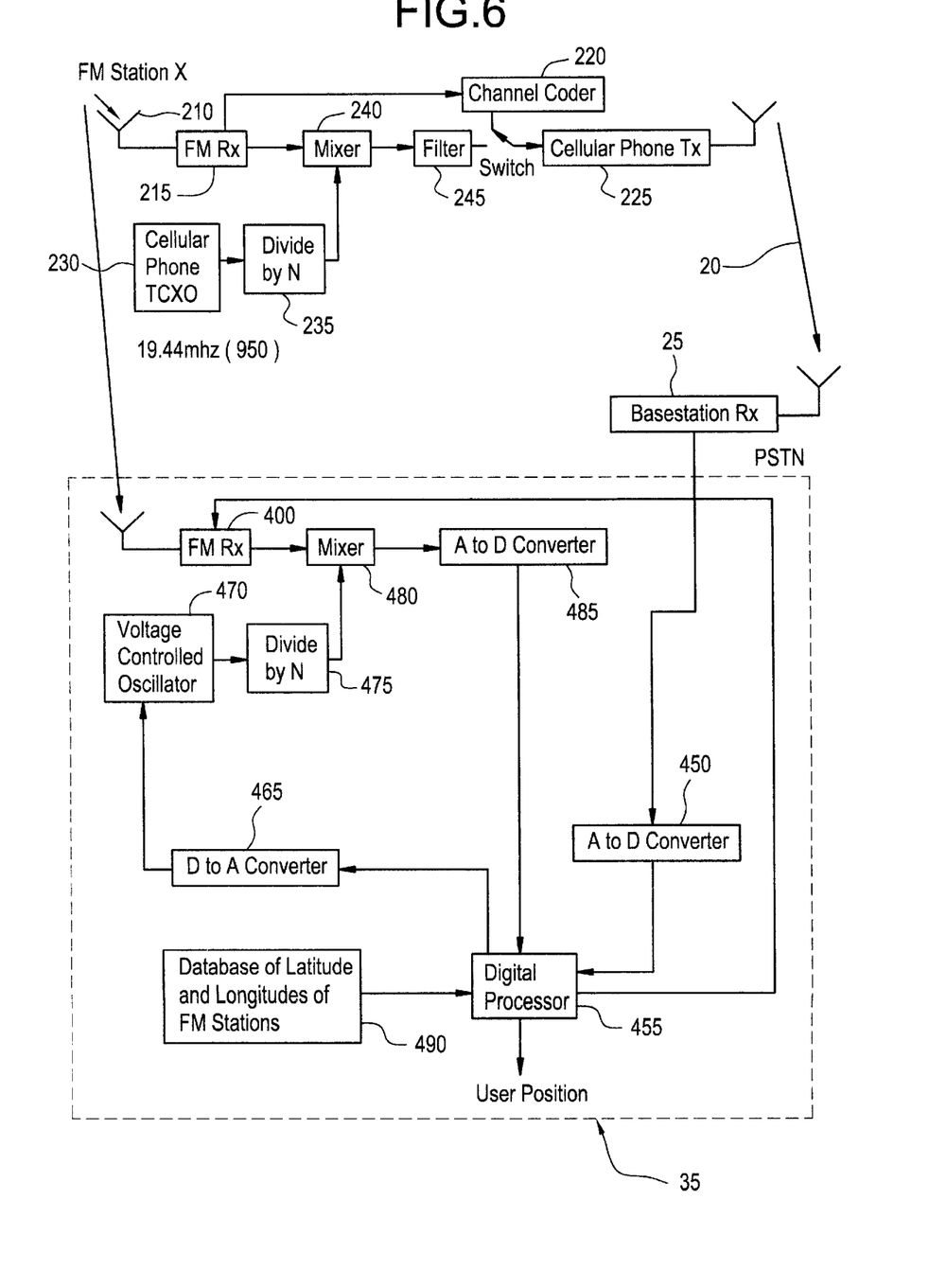
FIG. 6 is a block diagram of yet another embodiment.

Referring now to FIG. 6, there is illustrated an alternative embodiment of the system described with respect to FIG. 4, wherein only digital processing of the data is utilized. The FM station signals (namely the 19 kHz pilot signal) are received by an antenna 210 and processed by an FM receiver 215. A channel encoder 220 determines the FM channel being received and encodes the signal into a digital format for transmission via the mobile unit transmitter 225. A local oscillator 230 generates an oscillator signal which is divided by an integer N at 235 and mixed with a received FM pilot signal at mixer 240 to downconvert the FM pilot signal to the audio range. The downconverted signal is filtered by a lowpass or bandpass filter 245 prior to transmission by the mobile unit transmitter 225.

The signal from the base station receiver 25 is transmitted to the central server 35 and processed by an A/D converter 450. A digital processor 455 determines the channel information encoded within the received signal and forwards this to the FM receiver 460. The digital processor 455 also forwards a signal to a D/A converter 465 to enable a voltage control oscillator 470 to lock to a frequency that nulls the effects of the local oscillator 270 of the mobile unit 10. The voltage control oscillator signal is divided at 475 by an integer N such that the received FM pilot signal may be downconverted to the audio band at mixer 480. The downconverted signal is processed by an A/D converter 485, and the resulting digital signal from multiple FM signals are utilized by the digital processor 455 in conjunction with the data base 490 of latitude and longitude values of FM stations and the received FM signal to determine the position of the mobile unit 10.

Figure 7:
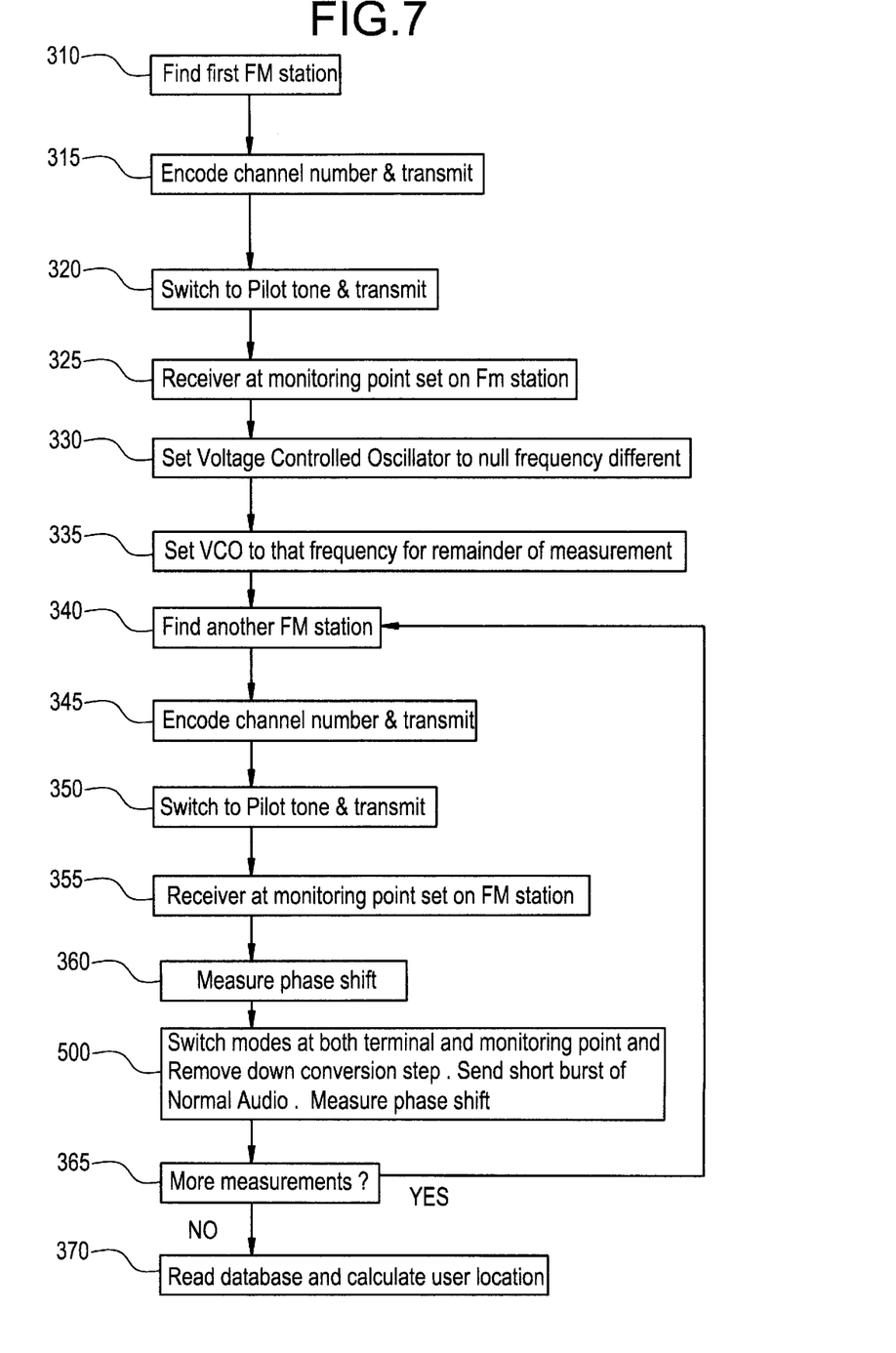
FIG. 7 is a flow diagram illustrating the operation of the embodiment of FIG. 6.

In the implementation of FIG. 6, the phase-locked loop functionality of FIG. 4 is processed digitally, and the VCO 470 is controlled through the D/A converter 465. FIG. 7 illustrates the method for locating a mobile unit 10 using the system illustrated in FIG. 5. The operation of the system would be the same as that previously discussed with respect to FIG. 5 with the following exception. An additional step 500 would be added for switching modes at both the mobile station and the central server to delete the downconversion step and transmit a short burst of normal audio such that a phase shift would be made in the audio mode. This step eliminates the 5 mile range on location ambiguity of the previuos method.

Although a preferred embodiment of the method and apparatus of the present invention has been illustrated in the accompanying Drawings and described in the foregoing Detailed Description, it is understood that the invention is not limited to the embodiment disclosed, but is capable of numerous rearrangements, modifications, and substitutions without departing from the spirit of the invention as set forth and defined by the following claims.

What is claimed is:

1. A method for locating a remote mobile unit, comprising the steps of:

detecting at least one transmitted signal from at least one known location at the mobile unit;

generating an identifier of a channel on which the at least one transmitted signal was detected;

transmitting to a second known location a portion of the at least one detected transmitted signal and the identifier of the channel;

tuning a receiver at the second known location to the channel indicated by the identifier;

detecting the at least one transmitted signals containing the transmitted portion at the second known location;

determining a time difference between the portion of the at least one transmitted signal received at the mobile station and the portion of the at least one transmitted signal received at the second known location; and locating a position of the mobile unit using the time difference and the at least one known location of the transmitted signal.

2. The method of claim 1, wherein the step of detecting further includes the steps of:

scanning for the at least one transmitted signal having at least a selected signal strength.

3. The method of claim 1, wherein the at least one transmitted signal comprises an FM signal.

4. The method of claim 1, wherein the at least one transmitted signal comprises an AM signal.

5. The method of claim 1, wherein the at least one transmitted signal comprises an TV signal.

6. The method of claim 1, wherein the at least one transmitted signal comprises an FM pilot tone signal.

7. The method of claim 1, wherein the step of generating further includes the step of:

encoding channels of the detected at least one transmitted signal into the transmissions to the second known location.

8. The method of claim 7, wherein the step of detecting further includes the step of:

setting a receiver at the second known location to the channels encoded in the transmission from the mobile unit.

9. The method of claim 1, wherein the step of determining further includes the step of:

time-shifting the portion of the transmitted signal until a correlation occurs between the transmitted signal received at the known location and the portion of the transmitted signal received at the mobile unit.

10. The method of claim 1, wherein the selection portion of the transmitted signal comprises audio data.

11. The method of claim 1 further comprising the step of repeating the steps of detecting, transmitting, detecting and determining for another transmitted signal.

12. The method of claim 1 further comprising the steps of:

downconverting the detected at least one transmitted signal at the mobile unit using a local oscillator signal; and nulling effects of the local oscillator signal at the second known location.

13. A system for locating a mobile transceiver, comprising:

a first receiver associated with the mobile transceiver for detecting at least one signal from at least one known location;

a second receiver at a second known location for detecting the at least one signal from the at least one known location;

an encoder associated with the first receiver for encoding a channel on which the at least one signal is received;

a decoder associated with the second receiver for decoding the encoded channel for the at least one signal;

a tuner for tuning the second receiver to the decoded channel;

a correlator for time-shifting a portion of the at least one signal from the first receiver until a substantial correlation occurs with the at least one signal detected at the second receiver; and a processor configured to determine a location of the mobile transceiver from the at least one known location of the at least one signal and the time-shift between the portion of the at least one signal received at the first receiver and the at least one signal received at the second receiver.

14. The system of claim 13, wherein the at least one signal comprises an FM signal.

15. The system of claim 13, wherein the at least one signal comprises an AM signal.

16. The system of claim 13, wherein the at least one signal comprises a TV signal.

17. The system of claim 13, wherein the at least one signal comprises an FM pilot tone signal.

18. The system of claim 13, wherein the at least one signal must have a predetermined signal strength.

19. The system of claim 13, wherein the portion of the at least one signal comprises an audio signal.

20. The system of claim 13 further comprising a switch for switching receiving functions between the first receiver and the mobile transceiver.

21. The method of claim 13 further comprising:

a local oscillator for generating a local oscillator signal;

a mixer for downconverting the at least one signal using the local oscillator signal; and means associated with the second known location for nulling effects of the local oscillator signal.

22. A method for locating a remote mobile unit, comprising the steps of:

scanning for at least one transmitted FM signal having at least a selected signal strength;

tuning a first receiver to a detected at least one transmitted FM signal at a first known location;

encoding a receiving channel of the at least one transmitted FM signal with an audio portion of the at least one transmitted FM signal;

transmitting to a second known location the encoded receiving channel and the audio portion of the at least one transmitted signal;

decoding the receiving channel;

tuning a second receiver at the second known location to the receiving channel to detect the at least one transmitted FM signal;

determining a time difference between the audio portion of the at least one transmitted FM signal from the first receiver and the at least one transmitted signal at the second receiver; and locating a position of the mobile unit using the time difference and the known location of the transmitted FM signal.

23. The method of claim 22, wherein the step of determining further includes the step of:

time-shifting the portion of the transmitted signal until a correlation occurs between the transmitted signal received at the known location and the audio portion of the transmitted signal received at the mobile unit.

24. The method of claim 22 further comprising the step of repeating the steps of detecting, transmitting, detecting and determining for another transmitted FM signal.

25. A system for locating a mobile transceiver, comprising:

a first receiver associated with the mobile transceiver for detecting at least one signal from at least one known location;

a second receiver at a second known location for detecting the at least one signal from the at least one known location;

first circuitry associated with the first receiver for generating an identifier of a channel on which the at least one signal is received;

a tuner for tuning the second receiver to the channel indicated by the identifier;

a correlator for time-shifting a portion of the at least one signal from the first receiver until a substantial correlation occurs with the at least one signal detected at the second receiver; and a processor configured to determine a location of the mobile transceiver from the at least one known location of the at least one signal and the time-shift between the portion of the at least one signal received at the first receiver and the at least one signal received at the second receiver.

* * * * *